(12) United States Patent
Prescott

(10) Patent No.: US 6,786,002 B2
(45) Date of Patent: Sep. 7, 2004

(54) FLOATABLE DEVICE

(76) Inventor: Mark R. Prescott, 58 Prescott Way, Stephentown, NY (US) 12168

( * ) Notice: Subject to any disclaimer, the term of this patent is extended or adjusted under 35 U.S.C. 154(b) by 19 days.

(21) Appl. No.: 10/318,703

(22) Filed: Dec. 13, 2002

(65) Prior Publication Data

US 2003/0110688 A1 Jun. 19, 2003

Related U.S. Application Data

(60) Provisional application No. 60/341,713, filed on Dec. 18, 2001.

(51) Int. Cl.[7] .............................. A01G 9/02; C02C 5/10
(52) U.S. Cl. ......................................... 47/65.5; 210/13
(58) Field of Search ...................... 47/1.4, 65; 210/484, 210/150; 220/560

(56) References Cited

U.S. PATENT DOCUMENTS

| | | | | |
|---|---|---|---|---|
| 2,531,562 A | * | 11/1950 | Eve | 47/80 |
| 2,711,714 A | * | 6/1955 | Timeus | 119/51.04 |
| 4,086,161 A | * | 4/1978 | Burton | 210/602 |
| 4,263,142 A | * | 4/1981 | Burton | 210/608 |
| 4,282,348 A | * | 8/1981 | Wada et al. | 528/500 |
| 4,312,152 A | * | 1/1982 | Drury et al. | 47/63 |
| 4,487,588 A | * | 12/1984 | Lewis, III et al. | 441/43 |
| 4,536,988 A | * | 8/1985 | Hogen | 47/1.5 |
| 4,888,912 A | * | 12/1989 | Murray | 47/1.4 |
| 5,011,602 A | * | 4/1991 | Totani et al. | 210/484 |
| 5,143,020 A | * | 9/1992 | Patrick | 422/265 |
| 5,528,856 A | * | 6/1996 | Smith et al. | 47/59 R |
| 5,618,428 A | * | 4/1997 | Oslund | 210/602 |
| 5,766,474 A | * | 6/1998 | Smith et al. | 210/602 |
| 5,799,440 A | * | 9/1998 | Ishikawa et al. | 47/65 |
| 5,836,108 A | * | 11/1998 | Scheuer | 47/65 |
| 6,014,838 A | * | 1/2000 | Asher | 47/65 |
| 6,022,480 A | * | 2/2000 | Girvan et al. | 210/756 |
| 6,086,755 A | * | 7/2000 | Tepper | 210/150 |

* cited by examiner

Primary Examiner—Charles T. Jordan
Assistant Examiner—Francis T. Palo
(74) Attorney, Agent, or Firm—Francis C. Hand; Carella, Byrne, Bain et al.

(57) ABSTRACT

The floatable planter is employed in a body of water, such as a fish pond, in order to prevent the growth of algae. The planter employs an aquatic pot for receiving a plant, a peat pot having a planting medium for receiving the aquatic pot, a floatation ring about the aquatic pot, a mass of decomposable material selected from the group consisting of barley straw and lavender, and a mesh bag that envelopes the pots, floatation ring and decomposable material. As the decomposable material decomposes, hydrogen peroxide is produced in order to act as an algaecide in the body of water. The floatation ring ensures the proper floatation of the straw or lavender in the water.

11 Claims, 2 Drawing Sheets

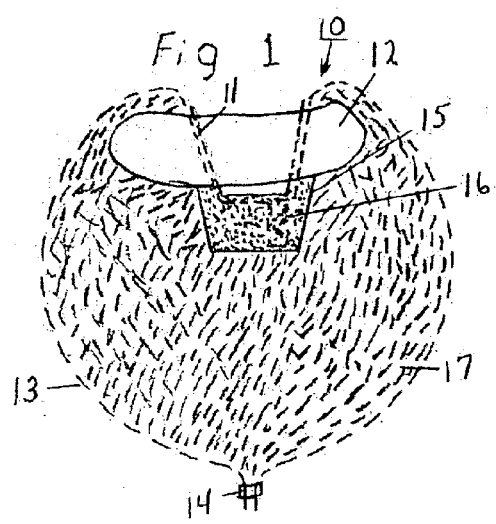
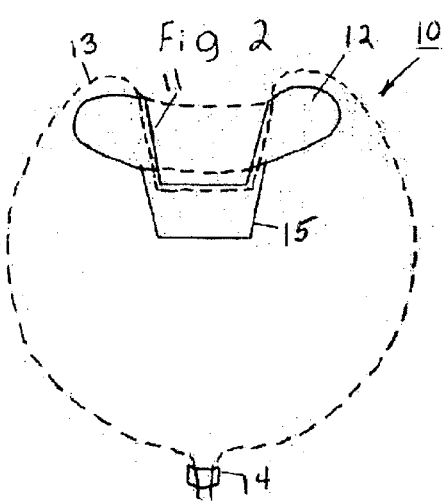
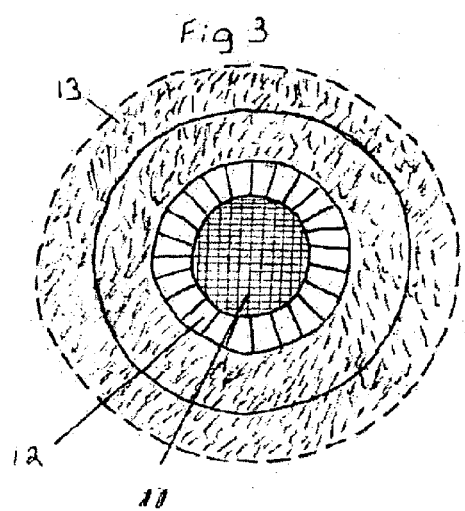
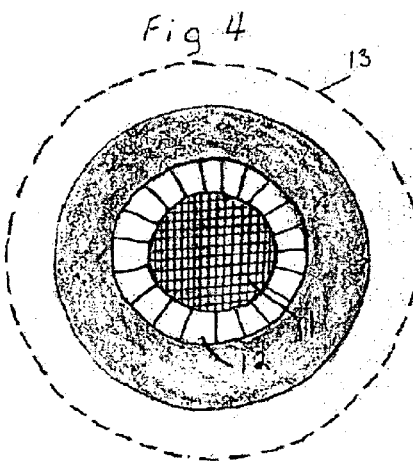

FLOATABLE DEVICE

This application claims the benefit of U.S. Provisional Application No. 60/341,713, filed Dec. 18, 2001.

This invention relates to a floatable device for forming an algaecide. More particularly, this invention relates to a floatable planter that utilizes the benefits of barley straw or lavender to form an algaecide for purifying a body of water.

Heretofore, various types of techniques have been known for growing plants in a soil-less environment, such as described in U.S. Pat. No. 4,382,348. Techniques have also been known in which parts of plant life may be cultivated in water, such as described in U.S. Pat. Nos. 4,487,588; 4,536,988; and 5,836,108.

It has also been known to provide floatation structures for dispensing fertilizer in a pond, such as described in U.S. Pat. No. 5,143,020 and to purify water using plants such as described in U.S. Pat. No. 5,528,856.

Other techniques have been known for cultivating aquatic plants, such as described in U.S. Pat. Nos. 4,888,912 and 5,799,440.

Still other techniques have been known in which bags of barley straw with cork floats have been placed in bodies of water to form an algaecide to prevent the growth of algae.

It is an object of this invention to improve the efficiency of barley straw or lavender in producing hydrogen peroxide for discouraging algae growth in a body of water.

It is another object of the invention to provide a relatively simple floatable planter for controlling algae growth in a body of water while providing a pleasing esthetic appearance.

Briefly, the invention provides a floatable device that embodies a mass of decomposable material characterised in forming hydrogen peroxide upon decomposition in water. Such a material may be selected from the group consisting of barley straw and lavender. In addition, the device has a fine mesh bag that encloses the mass of decomposable material and a flotation ring in the bag for positioning a part of the mass of decomposable material at the surface of a body of water in which the device is placed.

When the device is floated in a body of water, the straw or lavender is held at the surface of the water to be available to the greatest amount of oxygen. This ensures the proper breakdown of the straw or lavender to maintain the decomposing process aerobic.

The algaecide properties of barley straw or lavender are dependent on the proper breakdown of lignins in the stems of the plants into humic acids. The humic acids which are generated from the decomposing material mixes with oxygen in the water and sunlight, producing hydrogen peroxide which, in turn, discourages algae growth.

In one embodiment, an aquatic pot is incorporated into the device to receive an aquatic plant. In addition, a peat pot with a planting medium is disposed within the device so that the roots of the plant may grow through the aquatic pot into the planting medium. In addition, a fertilizer and a slow release nitrogen are placed in the planting medium. The nitrogen encourages the decomposition of the decomposeable mass. In this embodiment, the aquatic plant enhances the esthetic appearance of the device while the nitrogen containing planting medium encourages the bacterial breakdown of the decomposeable mass.

These and other objects and advantages of the invention will become more apparent from the following detailed description taken in conjunction with the accompanying drawings, wherein FIG. 1 illustrates a cross-sectional view of a device used as a planter in accordance with the invention;

FIG. 2 illustrates a view similar to FIG. 1 with the mass of decomposable material omitted;

FIG. 3 illustrates a top view of the planter of FIG. 1;

FIG. 4 illustrates a top view of the structure of FIG. 2;

Figure 5:
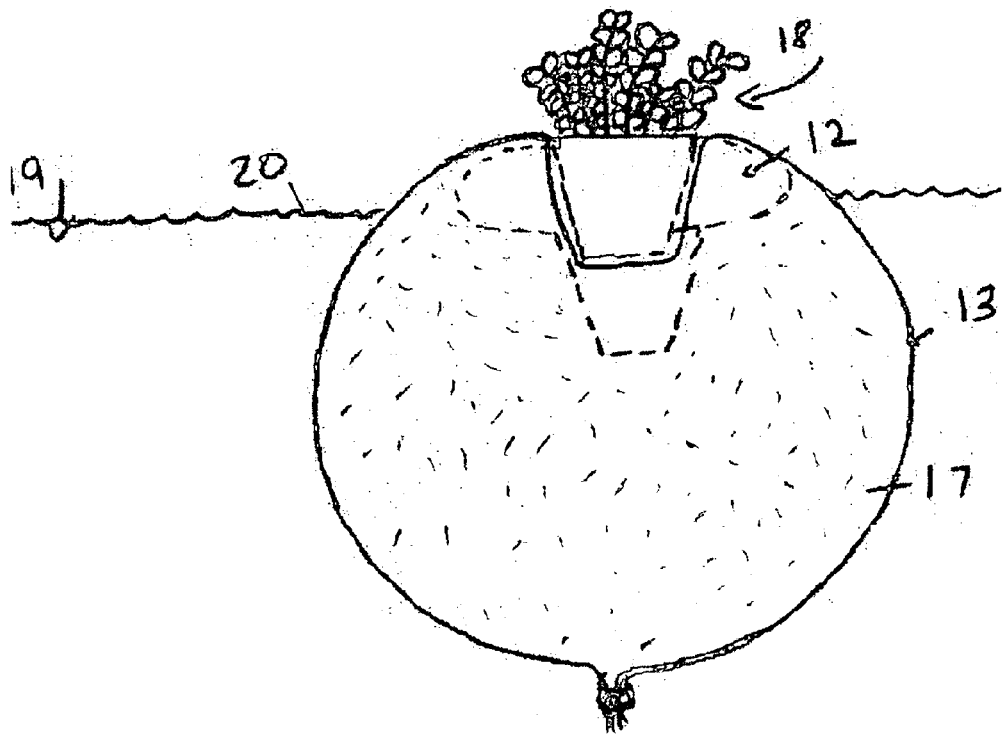
FIG. 5 illustrates the planter of FIG. 1 floating in a body of water and with a plant therein.
Figure 6:
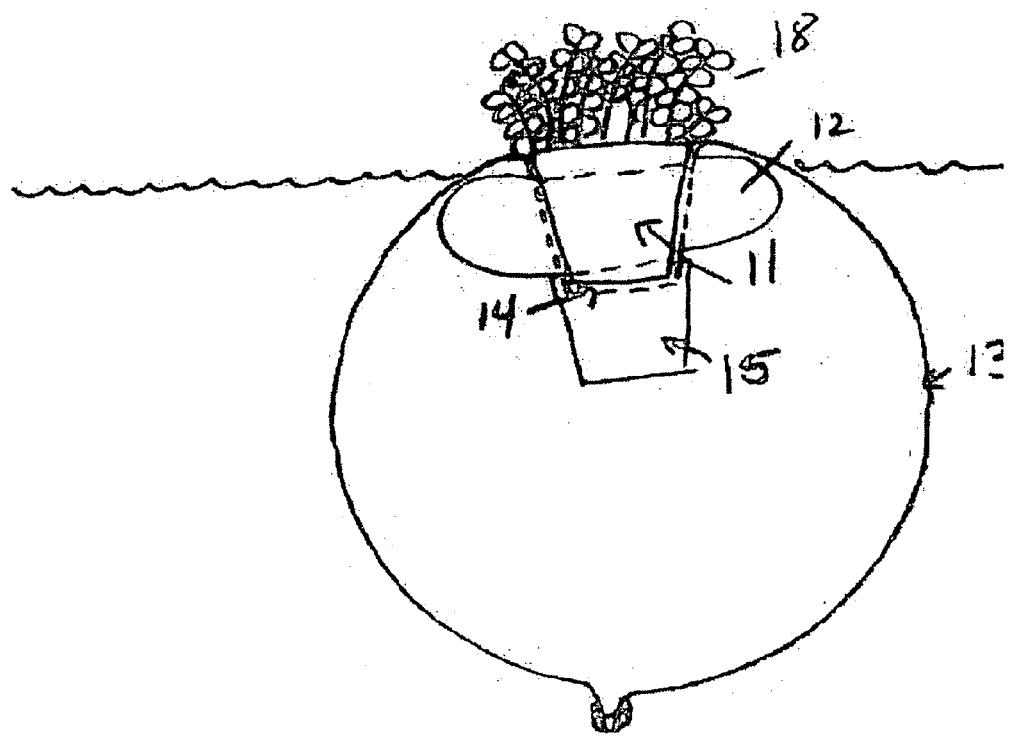
FIG. 6 illustrates a view similar to FIG. 5 without the decomposable material within the mesh bag for purposes of simplicity.

Referring to FIGS. 1 and 2, the floatable planter 10 includes an aquatic pot 11 for receiving a plant and a floatation ring 12 disposed about the pot 11 for floatation of the pot in a body of water. The floatation ring 12 may be made of any suitable material, such as a foam plastic. Typically, the aquatic pot 11 is of conical outer shape and the flotation ring 12 has an opening to receive the aquatic pot 11 in a fitted manner.

In addition, the planter 10 includes a fine mesh bag 13 having a closed end that encloses the pot 11 and is fitted with the pot 11 into the floatation ring 12.

The mesh bag 13 is inverted over the floatation ring 12 so that an open end is disposed below the pot 11 and ring 12. This open end of the bag 13 is closed by a clamp 14 to close the bag.

A peat pot 15 is also disposed within the bag 13 concentrically of and about the aquatic pot 11. As indicated, the peat pot 15 is of a larger diameter than the aquatic pot 11 and is filled with a planting medium 16 in which the aquatic pot is seated. For example, where the aquatic pot 11 is a 2" diameter pot, the peat pot 12 may be a 2¼" diameter pot.

In addition, a mass 17 of decomposable material that is characterised in forming hydrogen peroxide upon decomposition thereof in the presence of water is placed in the bag 13. The material is preferably selected from the group consisting of barley straw and lavender and is disposed about the aquatic pot 11, floatation ring 12 and peat pot 15.

As indicated in FIGS. 1 and 2, the mass 17 of decomposable material is disposed over the top surface of the floatation ring 12 to be exposed to air and sunlight. In addition, the decomposable material is disposed about the floatation ring 12 so as to be located at the level of the body of water into which the planter is to be placed.

When assembling the planter 10, a small amount of beneficial bacteria may also be added to the base of the aquatic pot 11.

The mesh bag 13 is provided with mesh openings of a size to contain the decomposable material within the bag 13.

The peat pot 15 is decomposable over time and allows the roots of an aquatic plant to grow through the pot 15 into the decomposing mass 17 of decomposable material. Alternatively, a plastic pot with holes in suitable locations may be used instead of the peat pot 15.

Referring to FIG. 5, when the planter 10 is to be used, an aquatic plant 18 is placed within the aquatic pot 11. Thereafter, the planter 10 is placed in the body of water 19 such that the floatation ring 12 is located at the surface 20 of the body of water 19. In this way, the decomposable material located about and above the floatation ring 12 is exposed to sunlight and air while the remainder of the decomposable material 17 is submerged within the body of water 19. Other items may be placed in the pot 11 other than an aquatic plant. In this case, the planting medium and nitrogen containing compound will aid the decomposition of the straw 17 and make the process more efficient.

During growth of the aquatic plant 18, the roots of the plant pass through the aquatic pot 11 and take root in the planting medium 16 within the peat pot 15. In this regard, a fertilizer may be incorporated into the planting medium 16 to encourage the growth of the aquatic plant 18. In addition, a slow-release nitrogen is provided in the planting medium 16 to aid in the decomposition of the mass 17 of decomposable material and the growth of the aquatic plant 18.

It is to be noted that the aquatic plant 18 serves two purposes. First, the plant 18 makes the planter 10 attractive and, secondly, helps the decomposable mass 17 to decompose in the body of water 19 in a proper manner. The roots of the aquatic plant 18 also aid in keeping the straw or lavender from collapsing in on itself. This is accomplished by the roots growing and filling the voids left by decomposing straw or lavender. The plant roots also aid in the breakdown of the straw or lavender by the synergistic relationship of bacteria to root plants.

As is known, plants send about 75% of the energy from photosynthesis to the plant root to help maintain healthy bacterial colonies. This function also helps to keep the straw or lavender decomposing evenly, thereby ensuring an even flow of hydrogen peroxide into the body of water 19 for controlling algae.

Another advantage of the planter is that the barley straw or lavender can be used in an aesthetic manner in an ornamental fish pond or water garden.

The invention, thus, provides a device that ensures the proper floatation of straw or lavender in a body of water in order produce an even breakdown of the straw or lavender and thus, an even supply of hydrogen peroxide.

Further, the invention also incorporates the use of a moisture-loving aquatic plant for eye appeal and to aid in the proper breakdown of the straw or lavender.

The proper amount of straw or lavender contained in the device is very important. For example, each device is constructed to treat 45 square feet of water. Thus, all the components of the device are made to function in a specific way to ensure the desired effect of water treatment and aesthetics.

The device may be constructed in different sizes to accommodate larger volumes of water. In this respect, the size of the net bag may be increased and the amount of floatation can be adjusted.

After the barley straw or lavender has fully decomposed, the remaining plant and root system can be planted into any pot of sufficient size and enjoyed for another growing season.

What is claimed is:

1. A floatable device comprising
   a mass of decomposable material characterised in forming hydrogen peroxide upon decomposition thereof in the presence of water;
   a fine mesh bag enclosing said mass; and
   a flotation ring in said bag for positioning a part of said mass of decomposable material at the surface of a body of water in which the device is placed.

2. A floatable device as set forth in claim 1 further comprising a first pot disposed within said ring for receiving an object and having said bag disposed between said pot and said ring.

3. A floatable device as set forth in claim 2 further comprising a second pot within said bag receiving said first pot therein and a planting medium in said second pot.

4. A floatable device comprising
   an aquatic pot for receiving a plant;
   a foam ring disposed about said pot for flotation of said pot in a body of water;
   a fine mesh bag enclosing said ring and said pot, said bag having a closed end receiving said pot and disposed between said pot and said ring and a second closed end disposed below said pot; and
   a mass of decomposable material selected from the group consisting of barley straw and lavender disposed within said bag and about said foam ring.

5. A floatable planter as set forth in claim 4 further comprising a peat pot disposed within said bag concentrically of and about said aquatic pot.

6. A floatable planter as set forth in claim 5 further comprising a planting medium in said peat pot receiving said aquatic pot.

7. A floatable planter as set forth in claim 6 further comprising a fertilizer in said planting medium.

8. A floatable planter as set forth in claim 7 further comprising a slow release nitrogen in said planting medium to aid decomposition of said mass of decomposable material.

9. A floatable planter comprising
   a peat pot;
   a planting medium in said pot;
   an aquatic pot disposed in said planting medium;
   a foam ring disposed about said aquatic pot for flotation of said aquatic pot in a body of water;
   a fine mesh bag enclosing said ring and said pots, said bag having a closed end receiving said aquatic pot and disposed between said pot and said ring and a second closed end disposed below said pots; and
   a mass of decomposable material selected from the group consisting of barley straw and lavender disposed within said bag and about said foam ring and said pots.

10. A floatable planter as set forth in claim 9 further comprising a fertilizer in said planting medium.

11. A floatable planter as set forth in claim 10 further comprising a slow release nitrogen in said planting medium to aid decomposition of said mass of decomposable material.

* * * * *